(12) United States Patent
Quakernack et al.

(10) Patent No.: US 12,153,388 B2
(45) Date of Patent: Nov. 26, 2024

(54) CIRCUIT FOR COUPLING A FIELD BUS AND A LOCAL BUS

(71) Applicant: WAGO Verwaltungsgesellschaft mbH, Minden (DE)

(72) Inventors: Frank Quakernack, Bielefeld (DE); Hans-Herbert Kirste, Minden (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 916 days.

(21) Appl. No.: 16/827,112

(22) Filed: Mar. 23, 2020

(65) Prior Publication Data

US 2020/0218215 A1 Jul. 9, 2020

Related U.S. Application Data

(63) Continuation of application No. PCT/IB2018/000822, filed on Jul. 30, 2018.

(30) Foreign Application Priority Data

Sep. 23, 2017 (DE) ...................... 10 2017 008 945.0

(51) Int. Cl.
G05B 19/042 (2006.01)
G05B 19/418 (2006.01)
G06F 13/40 (2006.01)

(52) U.S. Cl.
CPC ....... *G05B 19/042* (2013.01); *G05B 19/4185* (2013.01); *G06F 13/4054* (2013.01);
(Continued)

(58) Field of Classification Search
None
See application file for complete search history.

(56) References Cited

U.S. PATENT DOCUMENTS

| 5,379,381 A * | 1/1995 | Lamb | G06F 13/28 |
| | | | 710/24 |
| 7,788,440 B2 * | 8/2010 | Weichhold | H04L 12/4625 |
| | | | 710/310 |

(Continued)

FOREIGN PATENT DOCUMENTS

| DE | 10 2010 020 446 A1 | 11/2011 |
| DE | 10 2013 106 572 A1 | 12/2014 |

(Continued)

*Primary Examiner* — Idriss N Alrobaye
*Assistant Examiner* — Dayton Lewis-Taylor
(74) *Attorney, Agent, or Firm* — Muncy, Geissler, Olds & Lowe, P.C.

(57) ABSTRACT

A circuit for coupling a field bus and a local bus. A field bus controller is equipped to send and receive process data over the field bus. A local bus controller is equipped to send and receive the process data over the local bus. A data management unit is connected to the field bus controller and the local bus controller. The data management unit is equipped to transfer the process data between field bus controller and local bus controller. A memory area connected to the data management unit for copying and storing the process data. A processor connected to the data management unit and connected to the memory area. The processor is equipped to set up the data management unit to copy the process data into the memory area and the processor is equipped to read out the process data copied in the memory area.

16 Claims, 3 Drawing Sheets

(52) U.S. Cl.
   CPC .............. *G05B 2219/25006* (2013.01); *G05B 2219/25204* (2013.01); *G05B 2219/31135* (2013.01)

(56) References Cited

U.S. PATENT DOCUMENTS

| | | |
|---|---|---|
| 8,291,142 B2 | 10/2012 | Kuschke et al. |
| 8,554,978 B2 | 10/2013 | Buesching et al. |
| 10,007,633 B2 | 6/2018 | Kroner et al. |
| 2003/0200323 A1 | 10/2003 | Dold et al. |
| 2009/0225768 A1 | 9/2009 | Hsu et al. |
| 2010/0146225 A1* | 6/2010 | Biehler ............... H04L 12/4625 711/E12.002 |
| 2013/0326165 A1* | 12/2013 | Chang ................. G06F 9/30032 711/155 |
| 2015/0046634 A1* | 2/2015 | Maeda ................ G06F 12/0868 711/103 |
| 2017/0004101 A1* | 1/2017 | Shao ....................... G06F 13/28 |

FOREIGN PATENT DOCUMENTS

| | | |
|---|---|---|
| EP | 1 349 024 A2 | 10/2003 |
| WO | WO 2009/0124780 A1 | 10/2009 |
| WO | WO 2014/206680 A1 | 12/2014 |

\* cited by examiner

CIRCUIT FOR COUPLING A FIELD BUS AND A LOCAL BUS

This nonprovisional application is a continuation of International Application No. PCT/IB2018/000822, which was filed on Jul. 30, 2018, and which claims priority to German Patent Application No. 10 2017 008 945.0, which was filed in Germany on Sep. 23, 2017, and which are both herein incorporated by reference.

BACKGROUND OF THE INVENTION

Field of the Invention

The present invention relates to a circuit for coupling a field bus and a local bus.

Description of the Background Art

A field bus is a bus system that connects field devices in a system, such as transducers (sensors) and control elements (actuators), for the purpose of communication with an automation device. There are standardized protocols for the communication between the aforementioned field devices. Many different field bus systems with different characteristics are established on the market. Since 1999, field buses have been standardized in the IEC 61158 standard (Digital data communication for measurement and control—Fieldbus for use in industrial control systems). The current generation of field bus technology is based on real-time Ethernet. Known field buses include Ethernet-/IP, PROFIBUS, PROFINET, and EtherCAT, for example.

From WO 2009 124780 A1, which corresponds to U.S. Pat. No. 8,291,142, a bus coupler is known that converts a network-specific message coming from an external network into an internal data message that transmits only the payload data from the network-specific message. In addition, the internal data message contains at least one state information field for internal control information. The internal data message is passed from the bus coupler to a local bus system that is referred to as an internal bus system and to which multiple bus nodes are connected in series.

From WO 2014/206680, which corresponds to U.S. Pat. No. 10,007,633, a method for operating a field bus coupler is known for connecting input/output modules to a field bus of an industrial automation system over a local bus referred to as a sub-bus. In a normal operating mode in this method, the field bus coupler receives an output value for an output channel of at least one input/output module over the field bus, and forwards this value over the sub-bus to the input/output module. The field bus coupler receives an input value from an input/output module over the sub-bus, and forwards this value over the field bus.

From DE 10 2010 020 446 A1, which corresponds to U.S. Pat. No. 8,554,978, which is incorporated herein by reference, is known an automation device having at least one field bus interface for connection to a field bus and transmission of data packets with process data over the field bus, and having at least one local bus interface for connection to a local bus and transmission of process data between field devices connected to the local bus and the automation device. Means are provided for converting the data packets coming from the field bus into a data stream for the local bus and for converting the data stream directed to the automation device by the local bus into data packets for the field bus.

SUMMARY OF THE INVENTION

It is therefore an object of the present invention to provide a circuit for coupling a field bus and a local bus that is improved to the greatest degree possible.

A circuit for coupling a field bus and a local bus is provided. The circuit has a field bus controller that is equipped to send and receive process data over the field bus.

The circuit has a local bus controller that is equipped to send and receive the process data over the local bus.

The circuit has a data management unit. The data management unit is connected to the field bus controller and the local bus controller. The data management unit is equipped to transfer the process data between field bus controller and local bus controller.

The circuit has a memory area. The memory area is connected to the data management unit for copying and storing the process data.

The circuit has a processor. The processor is connected to the data management unit. The processor is connected to the memory area. The processor is equipped to set up the data management unit to copy the process data into the memory area. The processor is equipped to read out the process data copied in the memory area.

The circuit can be arranged as an electronic circuit on a circuit board and/or integrated into a number of semiconductor chips. A field bus serves the purpose of communication in an automation system. The field bus is primary/higher-level with respect to the local bus. The local bus is subordinate/lower-level with respect to the field bus. Advantageously, the field bus and the local bus are different, in particular in the protocols used. Because the transmission of the field bus and the local bus is different in this case, the circuit preferably is equipped to convert the field bus message from the field bus into a local bus data packet of the local bus. According to an advantageous embodiment of the invention, a local bus interface has a specific connection mechanism, e.g., in the form of metal contacts.

The field bus controller in this design can be an electronic subcircuit for communication over the field bus. The field bus controller can also be referred to as a field bus core. Preferably, the field bus controller is equipped to extract the process data from a field bus message after receiving the field bus message. Preferably, the field bus controller is equipped to create a field bus message for transmission and to insert the process data into the field bus message. Accordingly, the field bus controller has an interface to the field bus. The field bus controller preferably is fully hardware-controlled for communication over the field bus, which is to say does not have a freely programmable software program for communication. The field bus controller is implemented in an integrated circuit, for example, in particular in an ASIC (application specific integrated circuit) or FPGA (field programmable gate array).

The local bus controller can be an electronic subcircuit for communication over the local bus. Preferably, the local bus controller is equipped to extract the process data from a local bus data packet after receiving the local bus data packet. Preferably, the local bus controller is equipped to create a local bus data packet for transmission and to insert the process data into the local bus data packet. The local bus controller can also be referred to as a local bus core. "A local bus controller" in this context is to be understood in the sense of "at least one local bus controller," so the circuit can have just one or several local bus controllers. The local bus controller has an interface to the local bus. The local bus controller preferably is fully hardware-controlled for communication over the local bus, which is to say does not have a freely programmable software program for communication. The local bus controller is implemented in an integrated circuit, for example, in particular in an ASIC (application specific integrated circuit) or FPGA (field programmable gate array).

The field bus controller of the circuit is equipped, in particular, to retrieve process data from a payload data area of the field bus message. The payload data area is also referred to as the payload. "A field bus controller" in this context can be understood in the sense of "at least one field bus controller," so the circuit can have just one or several field bus controllers. The received process data are preferably assigned to one or more local bus nodes. Accordingly, the received process data are to be forwarded to local bus nodes over the local bus.

Process data are the digital representation of analog and digital values in a technical process. The process data advantageously are obtained from the technical process by means of sensors and/or are used to control actuators in the technical process. The process data are transmitted with the field bus and the local bus of a bus system for the process.

The data management unit in this design is an electronic subcircuit as an intermediate link between the field bus controller and the local bus controller. Accordingly, the data management unit has in-circuit interfaces to the field bus controller and to the local bus controller. The data management unit preferably is fully hardware-controlled for transfer of the process data, which is to say does not have a freely programmable software program for the transfer. "Transfer" is understood in this context to mean that the process data are brought in a controlled way from one part of the circuit (e.g., field bus controller), for example from a buffer of the same, to another part of the circuit (e.g., local bus controller), for example into an additional buffer associated therewith. The data management unit is implemented in an integrated circuit, for example, in particular in an ASIC (application specific integrated circuit) or FPGA (field programmable gate array). A connection within the circuit can be accomplished through a fixed conductor track, through an on-chip bus, or the like. For example the subcircuits, such as the field bus controller, local bus controller, and data management unit, are connected to one another by means of a 32-bit parallel bus.

A memory area is, for example, a volatile or nonvolatile memory. The memory area is advantageously implemented as dual-port RAM or as multiple buffers. For example, the memory area is implemented in an integrated circuit, in particular in an ASIC (application specific integrated circuit) or FPGA (field programmable gate array).

Copying should be understood in this context to mean that a preferably identical copy of the process data is created so that the process data are present in duplicate after the copying. The process data are then present in the local bus controller and at the same time in the memory area, for example. Original process data and copied process data can be further processed separately and independently of one another. For storage, the copied process data can be stored permanently or temporarily.

The processor of the circuit is any type of arithmetic logic unit that is equipped and designed to execute a freely programmable software program stored in a program memory. The processor is implemented as a CPU or microcontroller (μC) or the like. The setup of the copying of the process data by the processor preferably includes the setting of control data and/or control parameters. Configurations of the data management unit by the processor are also possible for the setup. For example, the processor sets up the data management unit by setting a number of bits in a memory associated with the data management unit. The readout of the process data from the memory area by the processor is accomplished, for example, in that the processor issues a read command and associated addresses of the memory area, or controls a switching matrix, or the like.

The data management unit can be equipped to carry out the transfer of the process data between field bus controller and local bus controller in ongoing operation, independently of a program execution of the processor. If the circuit is operating in a fault-free manner, then the resources of the data management unit and of the processor can advantageously be used simultaneously and independently of one another in ongoing operation. The processor thus is not occupied with the transfer of the process data, but instead is free for other tasks. Outside of ongoing operation, a debugging mode can be controlled in that the processor takes over control through the data management unit.

The data management unit can have a state machine for controlling the transfer. The state machine can also be referred to as a state machine. The basic behavior of a state machine is always the same: an input is presented to the state machine from outside as a series of characters. The state machine is in a specific state. Every time an input character arrives, a new state, the next state, can be established as a function of the input character and the current state (state transition or transition). The set of possible state transitions defines the behavior of the state machine. Preferably, the state machine is deterministic.

The data management unit can have an instruction list with instructions for controlling the transfer. Instructions are fed into the state machine so that the state machine performs the individual steps of the transfer. The instruction list advantageously defines the sequence in which the instructions are fed into the state machine.

The instruction list additionally can have control data for controlling the copying. The control data are a number of control bits per instruction, for example. In the simplest case, one control bit is associated with each instruction as control data. By means of the control bit, the copying can be switched on and off in a simple manner. Alternatively, more complex controls with multiple bits are also possible.

The data management unit can be equipped to perform the transfer and the copying at least partially simultaneously. "At least partially simultaneously" in this context means that the period of the transfer and a period of the copying overlap, preferably overlap to a great degree. A time offset can be brought about, for example, by the means that the copying begins a few clock cycles later than the transfer. The data management unit advantageously is equipped to perform the transfer and the copying in a clocked manner. In this design, the data management unit advantageously is equipped such that each bit or data symbol that is transferred in one clock cycle is also copied in that same cycle.

The data management unit can have a control output. The data management unit is equipped to control the copying through an enable signal at the control output. Preferably, the enable signal is based on the control data in the instruction list. For example, the enable signal is logic high when a control bit of the control data is likewise logic high. Alternatively, the enable signal can also be generated through computation from the control data.

The processor can be equipped to set up the control data so as to copy the transferred process data and to not copy additional process data during the transfer. The process data that are to be copied into the memory area can be windowed through the capability of setting up the copying or the not-copying. Accordingly, the additional process data are not available to the processor. As a result, the set of process data to be stored can be reduced significantly.

The processor can be equipped to analyze the process data that are read out of the memory area. For analysis, the processor advantageously is equipped to inspect the process data and/or to further process it and/or to display it through a display and/or to make it available to an external data processing unit (for instance, a PC), for example over the field bus or the local bus or through a service interface.

The processor can be equipped to issue a request signal to the data management unit. By means of the request signal, the processor can request new process data of the next transfer from the data management unit. Preferably, the data management unit is equipped to control the copying of the process data into the memory area based on the request signal. Alternatively, it is possible that the data management unit also copies the process data at every transfer.

The data management unit can be equipped to issue an acknowledgment signal to the processor after the copying. In this design, the acknowledgment signal is preferably generated when the completeness of the transfer is detected by the data management unit and/or the transferred data are determined to be valid, and thus contain no errors. Preferably, the processor is equipped to read the stored process data out of the memory area based on the acknowledgment signal. The readout preferably takes place within an arbitrary time period after the acknowledgment signal is received by the processor.

The processor can be equipped to read the process data out of the memory area asynchronously with respect to a cycle. For example, the cycle is a cycle for receiving the process data in a field bus message over the field bus and/or a cycle for transferring the process data and/or preferably a cycle for transmitting a data packet with the process data on the local bus. "Asynchronously" here defines that the readout is not coupled to a time in the cycle, for example the start time of the transfer, but instead can take place at an arbitrary time after the transfer.

The circuit for copying the process data can have a data line branch. In this design, the data management unit is connected to the local bus controller and the memory area through a first data line branch. Alternatively or in combination, the data management unit is connected to the field bus controller and the memory area through a second data line branch.

The object is additionally attained by a method for operating a circuit for coupling a field bus and a local bus.

In the method, a data packet with process data is transmitted cyclically on the local bus by a local bus controller of the circuit in a cycle frame.

In the method, the process data transmitted with the data packet are received beforehand in a field bus message by a field bus controller of the circuit.

In the method, the process data are transferred from the field bus controller to the local bus controller by means of a data management unit.

In the method, the process data are copied into a memory area by the data management unit and stored in the memory area.

In the method, the process data stored in the memory area are read out by a processor, in particular asynchronously with respect to the cycle frame.

The object is additionally attained by a method for operating a circuit for coupling a field bus and a local bus.

In the method, a data packet with process data is received cyclically, based on a cycle frame, on the local bus by a local bus controller of the circuit.

In the method, the process data received with the data packet are transmitted in a field bus message by a field bus controller of the circuit.

In the method, the process data are transferred from the local bus controller to the field bus controller by means of a data management unit.

In the method, the process data are copied into a memory area by the data management unit and stored in the memory area.

In the method, the process data stored in the memory area are read out by a processor, in particular asynchronously with respect to the cycle frame.

Further scope of applicability of the present invention will become apparent from the detailed description given hereinafter. However, it should be understood that the detailed description and specific examples, while indicating preferred embodiments of the invention, are given by way of illustration only, since various changes, combinaitons, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
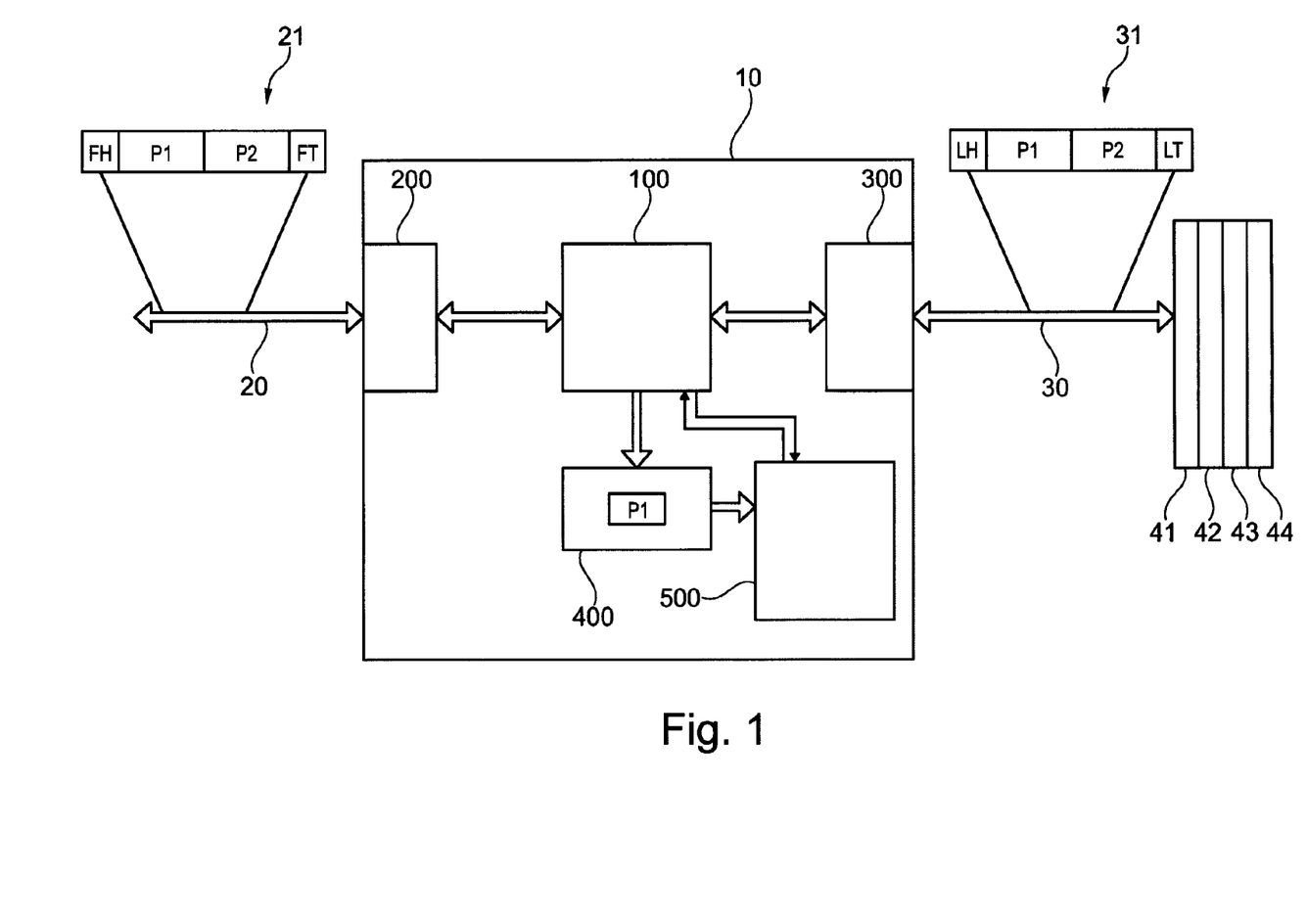
FIG. 1 is a schematic representation of a circuit of an exemplary embodiment of the invention as a block diagram in an automation system.

FIG. 1 shows a circuit 10 as a block diagram. The circuit 10 is part of an automation system with a field bus 20 and a local bus 30 and local bus nodes 41, 42, 43, 44. Also represented schematically are a field bus message 21, which can be transmitted over the field bus 20, and a local bus packet 31, which can be transmitted over the local bus 30. The field bus 20 can also be referred to as a higher-level bus, and the local bus 30 as a lower-level bus.

The circuit 10 is connected to the field bus 20 in the exemplary embodiment from FIG. 1. Furthermore, additional nodes and, if applicable, a control station can be connected to the field bus 20. The circuit 10 is likewise connected to the local bus 30. In the exemplary embodiment from FIG. 1, the circuit 10 is configured as master in the local bus 30. In contrast, the other local bus nodes 41, 42, 43, 44 are configured as slaves.

The circuit 10, as master of the local bus 30, is advantageously designed such that a data packet 31 transmitted by the master 10 is transmitted through all slaves 41, 42, 43, 44 connected to the local bus 30 and back to the master 10. In this design, a slave 42 always receives only a part of the data packet 31 from the slave 41 upstream of it. After a time period during which the data contained in this part can be processed by the slave 41, the part is forwarded to the downstream slave 42 and a new part of the data packet 31 is simultaneously received by the master 10. In this way, all parts of the data packet 31 sequentially pass through all slaves 41, 42, 43, 44. The local bus 30 is advantageously designed in a ring structure. Local buses of this nature can also be referred to as ring buses. Alternatively, the local bus can also be designed with a linear or star shape or as a combination or mixed form of the aforementioned. The transmission and receiving of the data packets 31 in this design is accomplished through a local bus interface of the master 10. In the exemplary embodiment of the figure shown here, the local bus 30 has a downward connection and an upward connection, as schematically represented by the double-headed arrow.

In the exemplary embodiment from FIG. 1, the bus connections of the local bus 30 are implemented with the aid of cables or printed circuit boards for direct or indirect contacting by means of electrical contacts. Alternatively, a wireless, optical connection or radio connection is possible. In the exemplary embodiment from FIG. 1, a master housing with the circuit 10, and the slaves 41, 42, 43, 44, have electrical contacts for the local bus 30. For simple concatenation of the housing and the slaves 41, 42, 43, 44, they can also be arranged on a common mount, for example a top-hat rail.

For easy comprehension, the slaves 41, 42, 43, 44 are shown in very simplified representation in the exemplary embodiment from FIG. 1; they can have, for example, an analog or digital input and/or an analog or digital output in order to be able to connect sensors or actuators for process control. The slaves 41, 42, 43, 44 can be modular in design so that a slave 41 can be removed from the bus system or added during operation. The ring bus infrastructure in this design is assembled from modular units, and the slaves 41, 42, 43, 44 are interchangeable so that the ring bus 30 can be assembled with any desired slave types and a desired number of slaves 41, 42, 43, 44. The modules are frequently also referred to as I/O modules.

The circuit 10 is designed and equipped for coupling the field bus 20 and the local bus 30. The circuit 10 can therefore also be referred to as a bus coupler. The circuit 10 has a field bus controller 200. The field bus controller 200 is equipped to send and receive process data P1 over the field bus 20. In the exemplary embodiment from FIG. 1, the process data P1 are contained in a field bus message 21. Also shown are additional process data P2, as well as a field bus header FH and a field bus trailer FT. Depending on the type of field bus used, the structure of the field bus messages can differ. A field bus message has the said process data P1 in any case. The field bus controller 200 is matched to the structure of the field bus message. In the exemplary embodiment from FIG. 1, the field bus controller 200 is equipped to receive the process data P1 with a field bus message 21 and to extract the process data P1 from the received field bus message 21. In addition, the field bus controller 200 in the exemplary embodiment from FIG. 1 is equipped to create a field bus message 21 and to insert process data P1 and the additional process data P2 into the field bus message. With respect to the process data P1 and the additional process data P2, FIG. 1 is a simplified representation. In FIG. 1, the process data P1 and the additional process data P2 are shown as contiguous in each case. However, the process data P1 can be divided into multiple segments.

The circuit 10 has a local bus controller 300. The local bus controller 300 is equipped to send and receive the process data P1 in a data packet 31 over the local bus 30. In the exemplary embodiment from FIG. 1, the process data P1 are contained in a data packet 31. Also shown are additional process data P2, as well as a local bus header LH and a local bus trailer LT. Depending on the type of local bus used, the structure of the data packets 31 can differ. The structure of the field bus message 21 and local bus data packet 31 generally differs as well. Preferably, the local bus data packet 31 is shorter than the field bus message 21.

A data packet 31 has the said process data P1 in any case. The local bus controller 300 is matched to the structure of the data packet 31. In the exemplary embodiment from FIG. 1, the local bus controller 300 is equipped to create a data packet 31 and to insert process data P1 into the data packet 31. The process data P1 are transmitted on the local bus 30 with the data packet 31. In contrast, received process data P1 are extracted from a received data packet 31.

So that the process data P1 arrive at the local data packet 31 from the field bus message 21 or arrive at the field bus message 21 from the local data packet 31, these process data P1 are transferred by the circuit 10.

The circuit 10 has a data management unit 100. The data management unit 100 is connected to the field bus controller 200 and the local bus controller 300 for data transmission. The data management unit 100 is equipped to transfer the process data P1 between the field bus controller 200 and local bus controller 300. In this design, the process data P1 can be transferred from the field bus controller 200 to the local bus controller 300 through the data management unit 100, or from the local bus controller 300 to the field bus controller 200 through the data management unit 100, as represented schematically in FIG. 1 by the double-headed arrows.

The data management unit 100 is additionally equipped to copy the process data P1 into a memory area 400. If the process data P1 are divided into multiple segments, the data management unit 100 is equipped to copy the process data P1 out of the segments and, advantageously, to merge them in the memory area 400. In the exemplary embodiment from FIG. 1, the data management unit 100 is equipped to perform the transfer and the copying at least partially simultaneously. Like the transfer, the copying in this design likewise is performed under hardware control so that the copying of the process data P1 takes place independently of a software program of the processor 500 in ongoing operation.

In the high-performance process data system of the circuit 10 in the exemplary embodiment from FIG. 1, it is advantageous to carry out the data transfer by means of hardware and not through a software program of a processor. A processor 500 is likewise shown in FIG. 1. The processor 500 of the exemplary embodiment from FIG. 1 is implemented as a host CPU, for example. It becomes clear in this context that the processor 500 does not carry out the transfer of process data P1 between field bus controller 200 and local bus controller 300. Data transfer by means of hardware makes the data transfer reproducible and deterministic. A software program is primarily required in such a system for configuration and for error handling. In the exemplary embodiment from FIG. 1, the data management unit 100 is equipped to carry out the transfer of the process data P1 between field bus controller 200 and local bus controller 300 in ongoing operation, independently of a program execution of the processor 500. In contrast, outside of ongoing operation, especially in debugging, the processor 500 can act directly on the transfer of the process data P1, for example for error analysis. FIG. 1 shows that the process data P1 are transported past the processor 500 for transfer in ongoing operation. The memory area 400 is provided so that the processor 500 nevertheless has the capability to observe or record the process data P1 in ongoing operation despite hardware transfer of the process data P1.

The memory area 400 of the circuit 10 is connected to the data management unit 100 for copying and storage of the process data P1. In order to give the processor 500 the capability to obtain the process data P1, the processor 500 is equipped to access the copy of the process data P1. In addition, the processor 500 is connected to the data management unit 100. Here, the processor 500 in the exemplary embodiment from FIG. 1 is equipped to set up the data management unit 100 at least to copy the process data P1 into the memory area 400. In addition, the processor 500 can be equipped to carry out further setup of the data management unit 100. In particular, the processor 500 is equipped to configure the data management unit 100 for transferring the process data P1 between the field bus controller 200 and the local bus controller 300.

In addition, the processor 500 is connected to the memory area 400 in the exemplary embodiment from FIG. 1. The connection is shown in simplified form in FIG. 1. The processor 500 is equipped at least to read out the process data P1 copied in the memory area 400. The memory area 400 in the exemplary embodiment from FIG. 1 is implemented as dual-port RAM, for example. In this design, communication with the processor 500 for reading out the process data P1 is accomplished through a request/acknowledge handshake, for example. Alternatively, the memory area 400 is implemented as a triple buffer or as a FIFO buffer.

In the embodiment from FIG. 1, the processor 500 is equipped to analyze the process data P1 read out of the memory area 400. For analysis, the processor 500 is equipped, for example, to inspect the copied process data P1 and/or to further process it and/or to make it available over a connection to a data processing unit that is external to the circuit 10. For example, the processor 500 could prepare the copied process data P1 for analysis and graphically display it on a display as text or items.

Schematically shown in the exemplary embodiment from FIG. 1, in addition to the transferred and copied process data P1, are additional process data P2, which are not copied into the memory area 400 even though they are transferred between field bus controller 200 and local bus controller 300. Preferably, the data management unit 100 is equipped to filter out of the aggregate process data the process data P1 that are to be copied. Preferably, the data management unit 100 is equipped to determine, through windowing from the aggregate process data, the process data P1 that are to be copied. In contrast to FIG. 1, it is also possible for no additional process data P2 to be present, so that all process data P1 are transferred and also copied.

The automation system shown in FIG. 1 is only exemplary in nature, and all elements, modules, components, masters, slaves, nodes, and units belonging to the automation system can be designed differently from FIG. 1 but nonetheless fulfill the basic functionalities described here.

Figure 2:
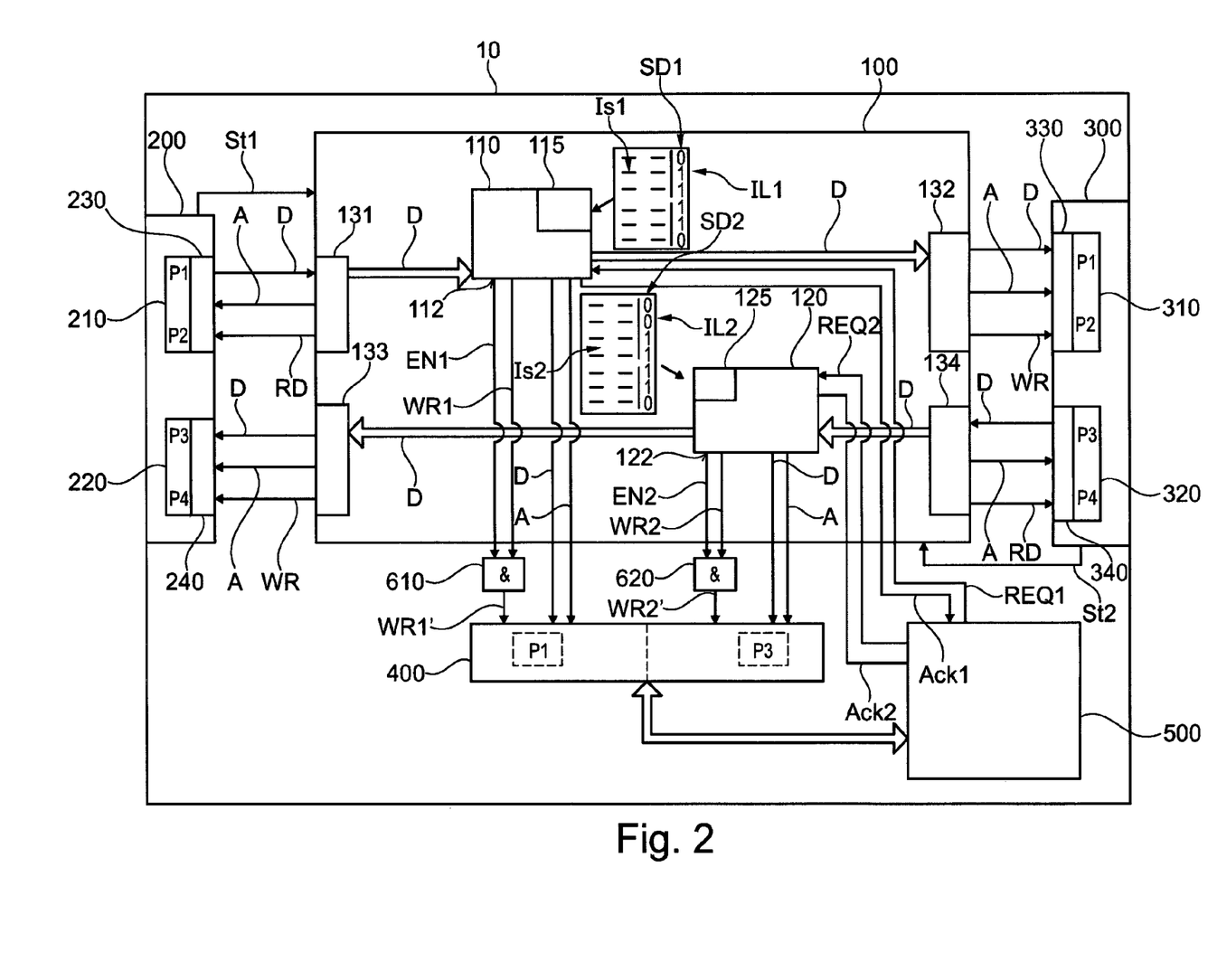
FIG. 2 is a schematic representation of a circuit of an exemplary embodiment of the invention.

In FIG. 2, an exemplary embodiment of a circuit 10 for coupling a field bus and a local bus is schematically represented. The exemplary embodiment shows the circuit 10 with a field bus controller 200 for sending and receiving process data P1 over a field bus and a local bus controller 300 for sending and receiving the process data P1 over a local bus. Connected between field bus controller 200 and local bus controller 300 is a data management unit 100 for transferring the process data P1 between field bus controller 200 and local bus controller 300. The circuit 10 has a memory area 400 with two subareas that is connected to the data management unit 100 for copying and storing the process data P1. The circuit has a processor 500 that is connected to the data management unit 100 to set up the copying of the process data P1, and is connected to the memory area 400 to read out the copied process data P1.

FIG. 2 shows a schematic representation of the circuit 10 as a block diagram. For purposes of simplification, some data lines are labeled D and some address lines are labeled A here. In the exemplary embodiment from FIG. 2, in order to give the processor 500 the capability to obtain the process data P1, P3, the data management unit 100 has a first data transfer unit 110 and a second data transfer unit 120, wherein a first subarea of the memory area 400 is assigned to the first data transfer unit 110, and a second subarea is assigned to the second data transfer unit 120. By means of address lines A that are separate from one another, the first data transfer unit 110 writes exclusively into the first subarea, and the second data transfer unit 120 writes exclusively into the second subarea. Due to this separation into subareas and separate address lines, the first data transfer unit 110 and the second data transfer unit 120 can write into the memory area 400 independently of one another, in particular even simultaneously. In the exemplary embodiment from FIG. 2, the memory area 400 can also be referred to as mirrored process data memory. From the viewpoint of the processor 500, the first subarea and the second subarea of the memory area 400 constitute an address space in the exemplary embodiment from FIG. 2.

The processor 500 is equipped to determine in advance, by means of a configuration of the first data transfer unit 110 and/or of the second data transfer unit 120, what process data P1, P3 are to be stored in the memory area 400. To control the data transfer between field bus controller 200 and local bus controller 300, the data management unit 100 has a state machine 115, 125. In the exemplary embodiment from FIG. 2, the first data transfer unit 110 of the data management unit 100 has a first state machine 115, and the second data transfer unit 120 has a second state machine 125. The state machine 115, 125 can also be referred to as a state machine. The state machine 115, 125 in this design is composed of hardware that performs the transfer of the process data P1, P3 independently of a software program. In the exemplary embodiment from FIG. 2, the state machine 115, 125 can be set up by the processor 500. For setup, the state machine 115, 125 is preferably programmable or configurable by the processor 500.

Advantageously, the data management unit 100 has an instruction list IL1, IL2 with instructions IS1, IS2 for controlling the transfer. In the exemplary embodiment from FIG. 2, a first instruction list IL1 is assigned to the first data transfer unit 110. Accordingly, a second instruction list IL2 is assigned to the second data transfer unit 120. The first instruction list IL1 in this design has instructions IS1 that can be set up by the processor 500 to control the first data transfer unit 110. The second instruction list IL2, accordingly, has instructions IS2 that can be set up by the processor 500 to control the second data transfer unit 120.

In the exemplary embodiment from FIG. 2, the data management unit 100 has master interfaces 131, 132, 133, 134 that are connected to slave interfaces 230, 240 of the field bus controller 200 and to slave interfaces 330, 340 of the local bus controller 300 by data lines D, address lines A, and control lines RD, WR1, WR2, WR1', WR2'. Initiated by a start signal over the control line St1, the master interface 131 controls, through the control line RD and the slave interface 230, a readout, for example, of the buffer 210 of the field bus controller 200 with the process data P1 and the additional process data P2. The readout is carried out symbol by symbol, for example over the address line A, wherein each symbol has a fixed bit width of, for example, 32 bits, 16 bits, or 8 bits. For example, the master interface 132 controls, through the control line WR and the slave interface 330, an entry of the process data P1 and the additional process data P2 into the buffer 310 of the local bus controller 300. The entry accordingly takes place over the address line A, once again symbol by symbol. A transfer in the other direction is also represented. Initiated by a start signal over the control line St2, the master interface 134 controls, through the control line RD and the slave interface 340, a readout of the buffer 320 of the local bus controller 300 with the process data P3 and the additional process data P4. The readout is carried out symbol by symbol, for example over the address line A. For example, the master interface 133 controls, through the control line WR and the slave interface 240, an entry of the process data P3 and the additional process data P4 into the buffer 220 of the field bus controller 200. The entry is carried out accordingly over the address line A, once again symbol by symbol.

In the exemplary embodiment from FIG. 2, the first data transfer unit 110 is equipped to transfer process data P1 from the field bus controller 200 to the local bus controller 300 based on the instructions IS1 of the first instruction list IL1. The second data transfer unit 120 is equipped to transfer process data P3 from the local bus controller 300 to the field bus controller 200 based on the instructions IS2 of the second instruction list IL2.

Preferably, the instruction list IL1, IL2 has control data SD1, SD2 to control the copying. In the exemplary embodiment from FIG. 2, each instruction list IL1, IL2 has separate control data SD1, SD2. The data management unit 100 has a control output 112, 122, and is equipped to control the copying through an enable signal EN1, EN2 at the control output 112, 122. In the exemplary embodiment from FIG. 2, binary control data SD1 are contained in the first instruction list IL1 of the first data transfer unit 110. The binary control data SD1 can be set up by the processor 500 such that the process data P1 are transferred and copied into the memory area 400, whereas in contrast the additional process data P2 are not copied into the memory area 400 even though they are transferred. The first data transfer unit 110 of the data management unit 100 is equipped to generate, based on the binary control data SD1, a first enable signal EN1 at the control output 112. The circuit 10 has a logical AND operation 610, for example in the form of an AND gate, wherein the first enable signal EN1 is ANDed with a control signal on the control line WR1, and issues a control signal on a first control line WR1' to the memory area 400 that controls the storage of the process data P1 in the memory area 400.

In the exemplary embodiment from FIG. 2, binary control data SD2 are contained in the second instruction list IL2 of the second data transfer unit 120. The binary control data SD2 can be set up by the processor 500 such that the process data P3 are transferred and copied into the memory area 400, whereas in contrast the additional process data P4 are not copied into the memory area 400 even though they are transferred. The second data transfer unit 120 of the data management unit 100 is equipped to generate, based on the binary control data SD2, a second enable signal EN2 at the control output 122. The circuit 10 has a logical AND operation 620, for example in the form of an AND gate, wherein the second enable signal EN2 is ANDed with a control signal on the control line WR2, and issues a control signal on a second control line WR2' to the memory area 400 that controls the storage of the process data P3 in the memory area 400.

Preferably, the processor 500 is equipped to issue a request signal REQ1, REQ2 to the data management unit 100, and the data management unit 100 is equipped to control the copying of the process data P1 into the memory area 400 based on the request signal REQ1, REQ2. In the exemplary embodiment from FIG. 2, the processor 500 is connected to the first data transfer unit 110 and the second data transfer unit 120. By means of the first request signal REQ1, the processor 500 controls the copying process through the first data transfer unit 110. The process data P1 received over the field bus are transferred through the first data transfer unit 110 and copied into the memory area 400. The first data transfer unit 110 of the data management unit 100 is equipped to issue a first acknowledgment signal ACK1 to the processor 500 after the copying. The processor 500 is equipped to read the stored process data P1 out of the memory area 400 based on the first acknowledgment signal ACK1. By means of a second request signal REQ2, the processor 500 controls the copying process through the second data transfer unit 120. The process data P3 received over the local bus are transferred through the second data transfer unit 120 and copied into the memory area 400. The second data transfer unit 120 of the data management unit 100 is equipped to issue a second acknowledgment signal ACK2 to the processor 500 after the copying. The processor 500 is equipped to read the stored process data P3 out of the memory area 400 based on the second acknowledgment signal ACK2.

Numerous advantages are achieved by means of the exemplary embodiment from FIG. 2. First of all, the data management unit 100 executes the transfer of the process data P1, P2, P3, P4 independently of the processor 500. Consequently, processing capacity of the processor 500 is not required for the transfer. Accordingly, the processor 500 cannot cause any delay of the transfer, and latencies are minimized. Because of the hardware control of the data management unit 100, the transfer of the process data P1, P2, P3, P4 is completely deterministic, with the result that neither a software program nor an external event, such as an interrupt event, has an effect on the transfer. Another advantage is that a software program is executed by the processor 500 in parallel with the communication by means of the transfer. It is a synergistic advantage that previously transferred process data P1, P3 can be processed in the software program of the processor 500. In the exemplary embodiment from FIG. 2, the advantage is achieved that the copied process data P1, P3 can be windowed/filtered by the control data SD1, SD2, so that a smaller memory area 400 is required in this case. Nevertheless, all required process data P1, P3 can be made available to the processor 500.

Figure 3:
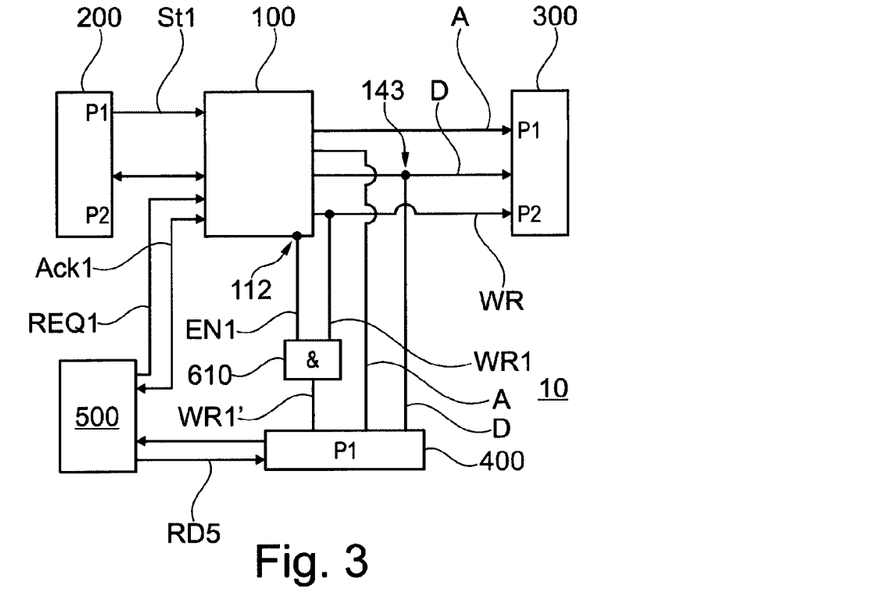
FIG. 3 is a schematic representation of a circuit of an exemplary embodiment of the invention.

In FIG. 3, a simple exemplary embodiment is schematically represented as a block diagram. FIG. 3 likewise shows a circuit 10 for coupling a field bus and a local bus. The circuit 10 has a field bus controller 200, a local bus controller 300, and a data management unit 100. The data management unit 100 is connected to the field bus controller 200 and the local bus controller 300. The data management unit 100 is equipped to transfer process data P1 between field bus controller 200 and local bus controller 300. The circuit 10 has a memory area 400, wherein the memory area 400 is connected to the data management unit 100 for copying and storing the process data P1. In addition, the circuit 10 has a processor 500 for executing a software program. The processor 500 is connected to the data management unit 100 and to the memory area 400. The processor 500 is equipped to set up the data management unit 100 to copy the process data P1 into the memory area 400 and to read out the process data P1 copied in the memory area 400. To this end, the processor 500 transmits the readout command RD5 to the memory area 400.

In the exemplary embodiment from FIG. 3, the circuit 10 has a data line branch 143 for copying the process data P1. This data line branch 143 is built in the form of a Y-connection. In this design, the data line D is connected to the output of the data management unit 100 and also to local bus controller 300 as well as to the memory area 400. The connection can have a width of 32 bits, for example, so that a branch is provided for each bit in the data line branch 143. As a result, the data management unit 100 is connected to the local bus controller 300 and the memory area 400 through the data line branch 143. Accordingly, the data management unit 100 can be connected through an additional data line branch to the field bus controller 200 and the memory area 400. The circuit 10 in the exemplary embodiment from FIG. 3 additionally has an AND operation 610, for example in the form of an AND gate. The write control signal on the control line WR1 accordingly is combined with an enable signal on the enable line EN1 by means of the AND operation. The write control signal on the control line WR1 is issued by the data management unit 100 to the local bus controller 300 when the process data P1 are transferred. In this process, the write control signal is issued at the same time to the memory area 400 through the AND operation 610 and the connected control line WR1' when the enable signal on the enable line EN1 enables this, accordingly has a high potential in the exemplary embodiment from FIG. 3. An address signal is issued through an address line A by the data management unit 100 to the local bus controller 300. An additional address signal is issued through an additional address line A by the data management unit 100 to the memory area 400. Advantageously, the two address signals are issued simultaneously. For example, it is possible to create different addresses through an offset on the address signal. In an exemplary embodiment, the address line A to the local bus controller 300 is omitted in that the data P1, P2 are always written to, e.g., the same address of a FIFO through the data line D.

Figure 4:
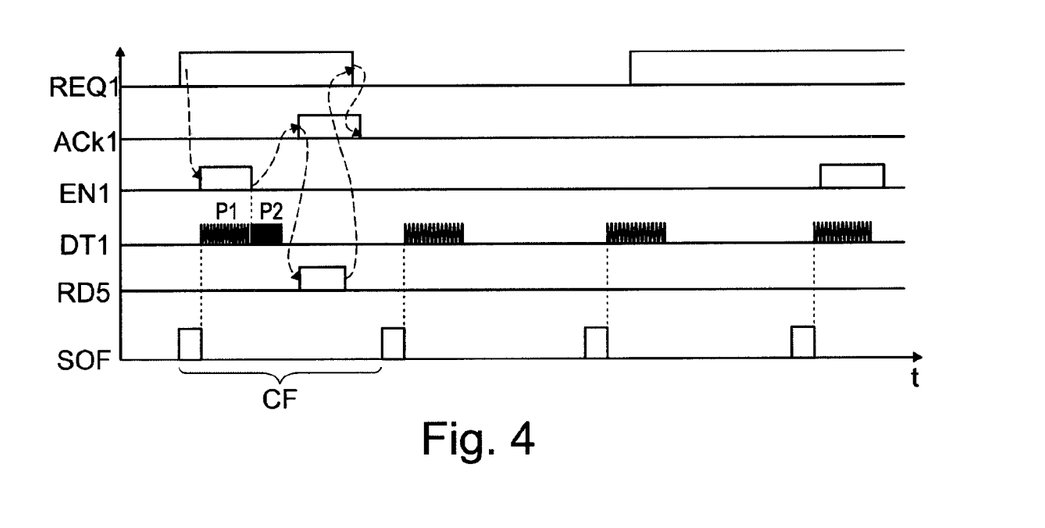
FIG. 4 is a schematic diagram for the circuit from FIG. 3.

For example, a method sequence of an exemplary embodiment of the invention can be carried out by the circuit 10 of the exemplary embodiment from FIG. 3, for which a schematic timing diagram is shown in FIG. 4. To this end, the processor 500 of the circuit 10 in FIG. 3 is equipped to read the process data P1 out of the memory area 400 asynchronously with respect to a cycle. The cycle is, for example, a cycle for receiving the process data P1 in a field bus message 21 over the field bus 20 in accordance with FIG. 1. Alternatively, the cycle is a cycle for transfer of the process data P1 by the data management unit 100. Preferably, the cycle is a cycle for transmitting a data packet 31 with the process data P1 on the local bus 30 in accordance with FIG. 1.

The exemplary embodiment in FIG. 4 shows a cycle frame CF of a cycle for transmitting a data packet 31 on the local bus 30, as shown in FIG. 1. The cycle frame CF is defined by cycle frame packet SOF, which is sent on the local bus 30 at essentially constant time intervals. Between two cycle frame packets SOF, the data packets 31 with process data P1, P2 can be transmitted over the local bus 30. In an exemplary embodiment, accordingly, one data packet 31 with process data P1 is transmitted cyclically in one cycle frame CF from the local bus controller 300 of the circuit 10 on the local bus 30. Prior to the transmission of the process data P1, the process data P1 are received by the field bus controller 200 of the circuit 10 in a field bus message 21.

The process data P1 are transferred from the field bus controller 200 to the local bus controller 300 by means of the data management unit 100. The data transfer DT1 for the aggregate process data P1, P2 is represented as a schematic signal in FIG. 4. In the exemplary embodiment from FIG. 4, the processor 500 sends a request signal REQ1 to the data management unit 100. Process data P1 are copied into the memory area 400 by the data management unit 100 and stored in the memory area 400. As this is taking place, the process data P1 are windowed by the enable signal EN1; additional process data P2 are only transferred, but are not stored in the memory area 400. After completed storage of the process data P1 in the memory area 400, the data management unit 100 sends an acknowledgment signal ACK1 to the processor 500, and in this way signals that the stored process data P1 can be read out. In the exemplary embodiment from FIG. 4, the process data P1 stored in the memory area 400 are read out by the processor 500 asynchronously with respect to the cycle frame CF. For this purpose, the processor 500 transmits a readout signal RD5 to the memory area 400 at an arbitrary point in time after the acknowledgment signal ACK1, as shown schematically in the diagram in FIG. 4. The dependence of the signal edges is represented schematically by dashed arrows in FIG. 4.

In another exemplary embodiment according to FIG. 1, the copying process takes place during a transfer from the local bus controller 300 to the field bus controller 200. Here, a data packet 31 with process data P1 is received cyclically by the local bus controller 300 of the circuit 10 on the local bus 30 based on a cycle frame CF. A cyclic receiving of the data packet on the local bus can take place, in particular, when all nodes forward the data packet at a constant time interval. The process data P1 received with the data packet 31 are transmitted by the field bus controller 200 of the circuit 10 in a field bus message 21. When a data packet 31 is received on the local bus 30 by the local bus controller 300, the process data P1 are transferred by the local bus controller 300 to the field bus controller 200 by means of the data management unit 100. The process data P1 are simultaneously copied into the memory area 400 by the data management unit 100 and stored in the memory area 400. At a later point in time that can be determined by the processor 500, the process data P1 stored in the memory area 400 are read out by a processor 500.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A circuit for coupling a field bus and a local bus, the circuit comprising:
   a field bus controller that is equipped to send and receive process data over the field bus;
   a local bus controller that is equipped to send and receive the process data over the local bus;
   a data management unit connected to the field bus controller and the local bus controller, the data management unit being equipped to transfer the process data between the field bus controller and the local bus controller;
   a memory area connected to the data management unit to copy and store the process data; and a processor connected to the data management unit and connected to the memory area, the processor being equipped to set up the data management unit so that the data management unit copies the process data into the memory area, and the processor being equipped to read out the process data copied in the memory area.

2. The circuit according to claim 1, wherein the data management unit is equipped to carry out the transfer of the process data between field bus controller and local bus controller in ongoing operation, independently of a program execution of the processor.

3. The circuit according to claim 1, wherein the data management unit has a state machine for controlling the transfer.

4. The circuit according to claim 1, wherein the data management unit has an instruction list with instructions for controlling the transfer.

5. The circuit according to claim 4, wherein the instruction list has control data for controlling the copying.

6. The circuit according to claim 5, wherein the processor is equipped such that the control data is set up via the processor so as to copy the transferred process data and to not copy additional process data during the transfer.

7. The circuit according to claim 1, wherein the data management unit is equipped to perform the transfer and the copying at least partially simultaneously.

8. The circuit according to claim 1, wherein the data management unit has a control output and is equipped to control the copying through an enable signal at the control output.

9. The circuit according to claim 1, wherein the processor is equipped to analyze the process data that are read out of the memory area.

10. The circuit according to claim 1, wherein the processor is equipped to issue a request signal to the data management unit, and wherein the data management unit is equipped to control, based on the request signal, the copying of the process data into the memory area.

11. The circuit according to claim 10, wherein the data management unit is equipped to issue an acknowledgment signal to the processor after the copying, and wherein the processor is equipped to read the stored process data out of the memory area based on the acknowledgment signal.

12. The circuit according to claim 1, wherein the processor is equipped to read the process data out of the memory area asynchronously with respect to a cycle or asynchronously with respect to:

a cycle for receiving the process data over the field bus in a field bus message; and/or
a cycle for transferring the process data; and/or
a cycle for transmitting a data packet with the process data on the local bus.

13. The circuit according to claim 1, further comprising a data line branch for copying the process data, wherein the data management unit is connected to the local bus controller and the memory area through the data line branch or wherein the data management unit is connected to the field bus controller and the memory area through the data line branch.

14. The circuit according to claim 1, wherein the data management unit communicates directly with the local bus controller and the field bus controller.

15. A method for operating a circuit for coupling a field bus and a local bus, the method comprising:
transmitting a data packet with process data cyclically on the local bus by a local bus controller of the circuit in a cycle frame;
receiving the process data, transmitted with the data packet, beforehand in a field bus message by a field bus controller of the circuit;
transferring the process data from the field bus controller to the local bus controller via a data management unit;
copying the process data into a memory area by the data management unit;
storing the process data in the memory area; and
reading out the process data, stored in the memory area, by a processor asynchronously with respect to the cycle frame.

16. A method for operating a circuit for coupling a field bus and a local bus, the method comprising:
receiving cyclically a data packet with process data, based on a cycle frame, on the local bus by a local bus controller of the circuit;
transmitting the process data, received with the data packet, in a field bus message by a field bus controller of the circuit;
transferring the process data from the local bus controller to the field bus controller via a data management unit;
copying the process data into a memory area by the data management unit and storing the process data in the memory area; and
reading out the process data stored in the memory area by a processor asynchronously with respect to the cycle frame.

* * * * *